United States Patent [19]

Brands et al.

[11] Patent Number: 5,227,245

[45] Date of Patent: Jul. 13, 1993

[54] BARRIER FILMS FOR PREVENTING SOLVENT ATTACK ON PLASTIC RESINS

[75] Inventors: Jan Brands, Terneuzen, Netherlands; Steven B. Swartzmiller, Midland, Mich.; Henri J. M. Grünbauer, Oostburg; Kees-Jeen van Duin, Terneuzen, both of Netherlands

[73] Assignee: The Dow Chemical Company, Midland, Mich.

[21] Appl. No.: 504,369

[22] Filed: Apr. 4, 1990

[51] Int. Cl.$^5$ .................. A47B 81/00; B32B 3/26; B32B 27/08; B65D 90/04
[52] U.S. Cl. .................................. 428/483; 220/444; 220/467; 220/902; 312/400; 312/236; 428/314.4
[58] Field of Search .................. 220/444, 467, 902; 264/46.6; 312/214, 236; 428/314.4, 483

[56] References Cited

U.S. PATENT DOCUMENTS 3,091,946 6/1963 Kesling .................. 312/214

Primary Examiner—George F. Lesmes
Assistant Examiner—Christopher Brown

[57] ABSTRACT

This invention relates to the use of a barrier film consisting essentially of thermoplastic homo- or copolymer polyester resin to protect a styrenic resin sheet which constitutes the inner liner wall of an insulative cabinet wall of, for example, a refrigeration appliance unit from attack by the halogen-containing blowing agents present in the insulative polyurethane foam found within the cabinet wall.

19 Claims, 1 Drawing Sheet

BARRIER FILMS FOR PREVENTING SOLVENT ATTACK ON PLASTIC RESINS

BACKGROUND OF THE INVENTION

This invention pertains to an insulative cabinet wall comprising a barrier film or layer used to protect plastic resins employed in the construction of the wall from attack by solvents. More specifically this invention relates to the use of barrier films consisting essentially of a polyester polymer to protect styrenic resins such as, for example, high impact polystyrene (HIPS) or acrylonitrile-butadiene-styrene (ABS) copolymers.

Such material is frequently susceptible to solvent attack by compounds, especially the halocarbon compounds used as blowing agents in the preparation of the insulative material contained within for example, an appliance, refrigeration or boiler unit.

The styrenic resin may be attacked by the halocarbon compounds becoming weakened and susceptible to failure and fracture. Material susceptible to attack in such manner is not desirable in an appliance unit as it can lead to loss in the overall thermal insulating efficiency of the unit and in some instances give rise to structural strength problems and eventual deformation of the unit.

It is known that the composition of the styrenic liner material may be modified to increase its resistance to attack from solvents. Greater resistance to some solvents, especially halogenated solvents, can be obtained by increasing the acrylonitrile content of an ABS copolymer or introducing a greater rubber content, see for example, U.S. Pat. No. 4,144,206. However, such a solution is not always feasible as other physical properties of the material such as impact strength or more critically moldability may change making them unsuitable for the intended application.

An alternative to modifying the composition of the styrenic liner material is to protect such material by the use of a barrier film or layer, wherein the insulative material is prevented from contacting the styrenic resin liner wall, see for example U.S. Pat. No. 3,960,631. In this document the use of a coextruded film comprising a low density polyethylene and an ethylene acrylic acid copolymer is disclosed. The film provides a physical barrier preventing adhesion of the insulative polyurethane foam to the styrenic liner. Preventing such adhesion greatly reduces environmental stress crack failure thereby significantly reducing the formation of fracture sites in the styrenic liner. Such fracture sites are the principal points where solvent attack can subsequently take place weakening and eventually allowing the polymer matrix to break. Similar barrier films serving the purpose to restrict adhesion and minimize stress crack failure are also disclosed in U.S. Pat. No. 4,707,401 and U.S. Pat. No. 4,196,950. In U.S. Pat. No. 4,005,919 use of barrier films in conjunction with ABS liner material is disclosed wherein the barrier film is a rubber-modified high nitrile polymer.

Such barrier films as described above are capable of offering some protection indirectly by minimizing occurrence of stress failure sites of the liner from attack by the halogenated compounds such as, for example, trichlorofluoromethane (Refrigerant-11) frequently employed in the manufacture of polyurethane foam. However, the continued use of certain fully halogenated compounds and especially trichlorofluoromethane is undesirable in view of the current opinion that their presence in earth's upper atmosphere may be a contributory factor in the recently observed reduction of ozone concentrations.

Recent developments in polyurethane technology has led to the identification of certain hydrogen-containing halogenated carbon compounds as being suitable physical blowing agent replacements for the traditionally employed fully halogenated chlorofluorocarbon compounds. Such recently identified alternative blowing agents are the "soft" chlorofluorocarbon compounds (HCFCs) and include dichlorotrifluoroethane (Refrigerant-123) and dichlorofluoroethane (Refrigerant-141b). These compounds are described as "soft" compounds due to the presence of hydrogen on the carbon backbone and are characterized by having very low or negligible ozone depletion potentials in contrast to the "hard", fully halogenated compounds.

However, in recent evaluation studies of the "soft" chlorofluorocarbon compounds a severe problem of attack on the styrenic resins used as liner material in the preparation of insulative cabinet walls has been observed. The attack of the liner is observed even in the presence of the barrier film commonly employed to prevent adhesion of the polyurethane foam to the styrenic liner, thus indicating that the material currently used as a physical adhesion barrier does not have sufficient chemical barrier properties to prevent attack by the halogenated blowing agent.

It is also apparent from evaluation studies that the aggressivity of some of the HCFC compounds, particularly Refrigerant-123, towards styrenic resins typically used in the construction of insulative cabinet walls is too great to be conveniently overcome by chemical modification of the composition of the styrenic resin without, for example, a significant loss in the moldability of the resin.

It is therefore desirable to consider the possibility of modifying or using an alternative barrier film. Desirably such an alternative barrier film should allow for efficient preparation of the shaped liner employed in the appliance unit and more importantly minimize or prevent attack of the styrenic resin by blowing agents, especially the newly identified HCFCs, used in manufacturing the polyurethane foam.

SUMMARY OF THE INVENTION

It has now been discovered that thermoplastic polyester material can adequately function as such a barrier film in insulative cabinet walls containing polyurethane foam.

In one aspect, this invention is an insulative cabinet wall structure suitable for use in a thermally insulated apparatus which comprises:
  a. an outer wall element;
  b. an inner wall element comprising a synthetic resin;
  c. a foamed-in-situ polyurethane foam contiguous to said outer wall element and positioned between said outer wall element and said inner wall element; and
  d. a barrier film interposed between said foamed-in-situ polyurethane foam and said inner wall element,
characterized in that the synthetic resin comprises a thermoplastic styrenic polymer and in that the barrier film consists essentially of a thermoplastic polyester resin which is a homo- or co-polymer adduct of an aromatic dicarboxylic acid and an active hydrogen-containing material.

In a second aspect, this invention is a composite material suitable for thermolding applications which comprises:

a thermoplastic synthetic resin sheet; and a barrier film in contact with said synthetic resin sheet, characterized in that the synthetic resin comprises a thermoplastic styrenic polymer and in that the barrier film is present in a thickness of at least 4 percent of the total thickness of the synthetic resin sheet and barrier film, and the barrier film consists essentially of a thermoplastic polyester resin which is a homo- or co-polymer adduct of an aromatic dicarboxylic acid and an active hydrogen-containing material.

Our investigations have surprisingly shown that the use of such polyester barrier film adequately protects the synthetic resin material employed in the construction of insulative cabinet walls from attack by the halogenated blowing agent present in the polyurethane foam. The protection afforded by the barrier film to the synthetic resin is surprising as normally the polyester material itself is considered susceptible to swelling and dissolution in halogenated compounds similar to the blowing agents as used in the preparation of polyurethane foams.

BRIEF DESCRIPTION OF THE DRAWING

Other features and advantages of the invention will be apparent from the following description taken in connection with the accompanying drawing wherein.

DETAILED DESCRIPTION OF THE INVENTION

Figure 1:
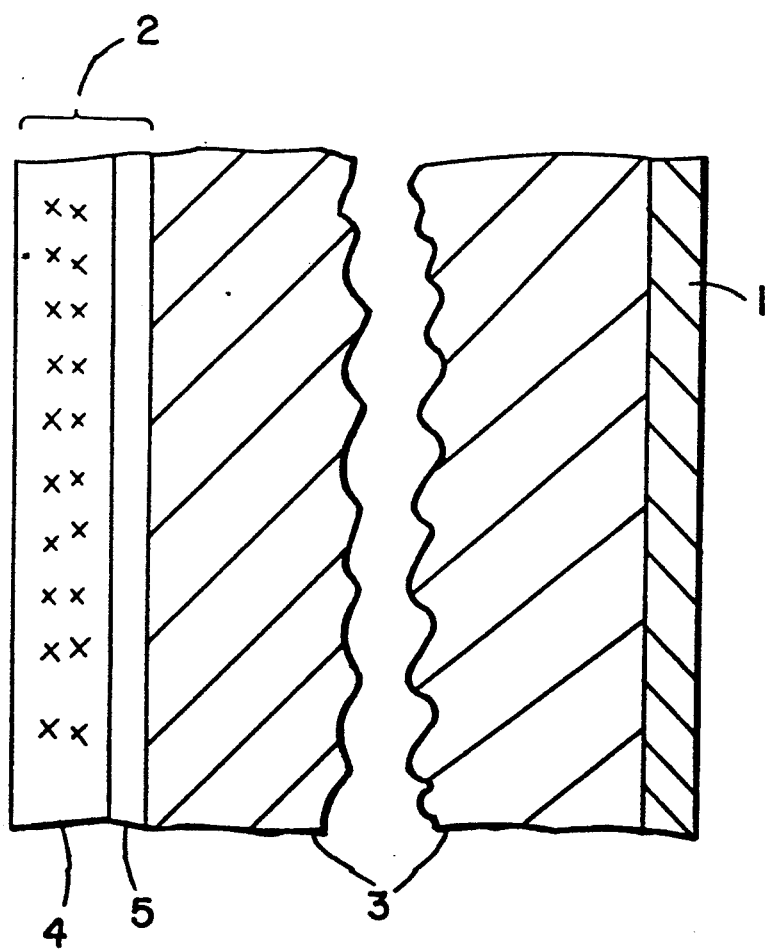
FIG. 1 is a perspective view of an insulative cabinet wall structure embodying the invention, with portions broken away to illustrate the insulative structure.

The insulative cabinet wall of this invention can be that of, for example, a refrigeration appliance unit or a boiler housing. Such a unit generally comprises an outer cabinet wall (1), which may be, for example, a metal sheet or foil, wood, synthetic resin or the like; an inner liner wall (2); and a body of foamed-insulation (3) therebetween.

The liner wall is characterized in that it is a composite material comprising a thermoplastic synthetic resin sheet (4) defining a first surface portion and having applied to said surface a barrier film (5) which consists essentially of a thermoplastic polyester resin. The barrier film is applied to the surface of the synthetic resin sheet that would normally come into contact with the insulation material. Additionally, barrier film may be also applied to other remaining surfaces of the synthetic resin sheet when it is desirable to benefit from other properties offered by the presence of the film such as, for example, surface gloss.

The inner liner wall is molded thermally and/or by pressure into the desired liner configuration and inserted into the outer cabinet wall with the insulation being foamed-in-place. The two walls are held in a spaced relationship whilst the insulating material is introduced by a foam-in-place operation. The method of construction a refrigeration appliance unit in such a manner is disclosed in, for example, U.S. Pat. Nos. 3,960,631; 4,196,950; 4,505,919 and 4,707,401, the relevant portions of which are incorporated herein by reference.

The barrier film is present in a quantity and thickness sufficient to protect the synthetic resin sheet from attack by the physical blowing agent used in preparing the foamed-in-situ insulation. The quantity of barrier film present on the surface of the synthetic resin is conveniently expressed as a percentage thickness of the total thickness of the synthetic resin sheet and barrier film. Prior to thermolding, the barrier film constitutes at least 4, preferably at least 5 and more preferably at least 6 percent of said total thickness. Advantageously and for commercial reasons, the amount of barrier film present need not be greater than about 20, preferably about 15, and more preferably about 12 percent of the combined resin sheet and barrier film thickness.

The thickness of barrier film present in the different regions of the shaped liner may vary depending on the degree of extension in the molding procedure. When preparing shaped or molded liners the draw ratio, or degree of extension of resin sheet to shaped liner, may be from about 1:2 to 1:10 and preferably from about 1:2 to about 1:6. When the liner material has been molded to a given shape and configuration, the thickness of the resulting barrier film advantageously is at least 30, preferably at least about 40 and more preferably at leas about 50, microns. Where the barrier film is present in quantities less than this, then sufficient protection to the styrenic resin may not be afforded. The upper limit is defined by the quantity of film present on the non-shaped composite material and the draw ratio employed when shaping the liner. Typically, after shaping of the liner the amount of barrier film present will not exceed about 200, preferably not exceed about 150, and more preferably not exceed about 120 microns.

The barrier film used in this present invention consists essentially of a homo- or co-polymer adduct of an aromatic dicarboxylic acid reacted with an active hydrogen-containing compound, such adducts are commonly referred to as polyester polymers or resins.

Homopolyester polymers are derived from the reaction of one acid compound with one active hydrogen-containing compound; whilst copolyester polymers are derived from the reaction of at least two active hydrogen-containing compounds with one acid compound or inversely two acid compounds with one active hydrogen-containing compound. Such copolyester polymer resins are frequently described as "glycol-modified" or "acid-modified" copolyesters, respectively.

The acid compound may be an aliphatic, alicyclic or aromatic polyacid compound, preferably a diacid compound. More preferably, such a diacid compound is an aromatic dicarboxylic acid such as, for example, isophthalic acid, terephthalic acid, chloroterephthalic acid, methylterephthalic acid, 4,4'-biphenyldicarboxylic acid and the like. Preferred for this present invention are polyester polymers prepared from mono-aromatic dicarboxylic acids including isophthalic acid and especially terephthalic acid, or mixtures thereof.

The active hydrogen-containing adduct generally employed in the preparation of polyester resins is a polyhydroxyl compound. Advantageously, to confer the thermoplastic properties of the resin such a hydroxyl compound contains a molar average of about two hydroxyl groups. Exemplary of such hydroxyl compounds are the glycols including, for example, ethylene glycol, tetramethylene glycol, 1,4-cyclohexanedimethanol, dipropylene glycol, tripropylene glycol and aromatic dihydroxyl compounds such as, for example, bishydroxylphenyl compounds including 2,2-bis(4 hydroxyphenyl)propane. Preferred thermoplastic polyester resins for use in this present invention are those homopolymers and copolymers which are obtained by reaction of glycols, especially ethylene glycol or tetramethylene glycol, and cyclohexanedimethanol or mixtures thereof with the preferred aromatic dicarboxylic acids. Available commercially, and especially preferred for use in this present invention are the copolyester polyester resins, especially the glycol-modified polyethylene terephthalate resins such as, for example, KODAR TM PETG-6763 sold by Eastman Chemical Products Inc. Such copolyester resins have a greater tendency to be amorphous polymers, thereby having wider molding and extrusion process latitudes of value when preparing thin films.

Suitable thermoplastic polyester resins can be obtained by conventional preparation procedures such as disclosed in U.S. Pat. Nos. 2,597,643; 3,740,371; 4,018,738 and 4,034,016 and especially U.S. Pat. Nos. 4,474,918; 4,552,948; 4,565,851 and 4,578,437 which are incorporated herein by reference.

As already described, the liner wall is a composite material comprising a thermoplastic synthetic resin sheet to which has been applied an above described polyester resin.

For the purpose of this present invention the synthetic resin sheet comprises a thermoplastic styrenic resin. Preferred styrenic resins are acrylonitrile-butadiene-styrene (ABS) copolymers and high impact polystyrene (HIPS) polymers. Such resins are preferred because they offer some inherent environmental stress crack resistance and primarily have good moldability.

The ABS copolymer resins sheets that can be used in this present invention are well known to those skilled in the art, the preparation of such material is disclosed in, for example, U.S. Pat. Nos. 3,563,845; 3,565,746; and 3,509,237 all of which are incorporated herein by reference.

Exemplary of the preferred styrenic polymers are those commercially available from The Dow Chemical Company and include the ABS resins such as MAGNUM TM 3404 and MAGNUM TM 3153, MAGNUM TM 9043 and the high impact polystyrene resins such as STYRON TM 469 and STYRON TM 464.

The composite liner wall may be prepared by any of the conventionally known procedures. The barrier film may be laminated to the synthetic resin sheet by utilizing the inherent heat of extrusion of the synthetic resin sheet and a pressure application therebetween such as by suitable pressure rolls. Alternatively, the surface of the barrier film or the synthetic resin may be treated, preferably electrostatically, to promote adhesion of the film to the sheet.

The composite material used to prepare the inner wall of the insulative cabinet wall of this present invention may, in a preferred embodiment, be further characterized by the absence of a tie layer in comparison to other composite material. See for example the patent publication WO 8908556 where tie layers consisting of olefinic copolymers and dicarboxylic acids are disclosed.

In certain applications, a tie layer is necessary. When a thermoplastic polyester film (e.g. PETG) sheet is laminated to an acrylonitrile-butadiene-styrene (ABS) copolymer sheet, the interfacial bond is typically very strong. However, when PETG sheet is laminated to a high impact polystyrene (HIPS) sheet, the interfacial bond is typically weak, resulting in a peelable film. In order to strengthen the interfacial bond between the PETG sheet and the HIPS sheet and make the film non-peelable, a tie layer can be incorporated between the HIPS sheet and the PETG sheet. For scrap recovery, this tie layer material can also serve to compatibilize the PETG from the recycled sheet with the HIPS resin.

Examples of suitable materials for the tie layer includes ABS copolymer containing from about 5 to about 20 weight percent of acrylonitrile, ethylene vinyl acetate, and the like.

Techniques involving coextrusion of the synthetic resin and barrier film may also be employed to prepare the composite liner material.

Techniques of applying a film by lamination to, or coextrusion with a synthetic resin sheet are well known to those skilled in the art of producing composite materials. Such techniques for the application of film are disclosed in, for example U.S. Pat. Nos. 3,960,631; 4,005,919; 4,707,401 and 4,196,950.

A preferred technique of preparing the composite material employed as liner material in this present invention is by coextrusion.

For the purpose of practicing recovery and recycling of waste composite material, it is advantageous for the barrier layer to be peelable from the styrenic resin sheet, or compatible with the styrenic resin such that a significant loss in impact resistance does not occur when reground composite sheet is blended and reprocessed with the virgin styrenic resin.

The insulation used in the insulative cabinet wall of this invention is a closed-celled foamed material. Such material is light weight and advantageously, has a high thermal resistance and a high compressive strength sufficient to contribute to the benefit of overall structural strength of the wall. As the configuration and geometry of the outer and inner walls may vary, construction of the cabinet wall is facilitated if the insulation can be prepared by a foam-in-place procedure.

In the present invention, the preferred foamed-in-situ insulation is polyurethane foam. Polyurethane foam can be prepared by mixing intimately under reaction conditions an organic polyisocyanate with an isocyanate reactive, active hydrogen-containing compound such as, for example, a polyol in the presence of a blowing agent and introducing the foam-forming mixture into the space between the inner and outer liner walls of the cabinet.

Blowing agents employed in the preparation of the polyurethane are generally organic compounds having an atmospheric boiling point of from about $-50°$ C. to about $+100°$ C. Generally, such compounds selected for this purpose are halogenated organic compounds especially those containing fluorine and or chlorine as this additionally helps confers good thermal insulation properties to the foam.

In the present invention, the preferred blowing agent for use in preparing the polyurethane foam are those comprising a hydrohalocarbon. Hydrohalocarbons are preferred over perhalogenated carbon compounds due to their generally lower ozone depleting potentials, though the use of perhalogenated carbon compounds such as trichlorofluoromethane and dichlorodifluoromethane in small amounts is not precluded from the present invention.

Suitable hydrohalocarbon compounds include hydrochlorofluorocarbons, hydrofluorocarbons and hydrochlorocarbons, particularly those which are $C_{1-3}$ compounds due to their suitable boiling points.

Exemplary of suitable hydrochlorofluorocarbons are Refrigerant 21 (b.p. 8.9° C.), Refrigerant-123 (b.p. 27.1° C.), Refrigerant-123a (b.p. 28.2° C.), Refrigerant-124 (b.p. −12° C.), Refrigerant-124a (b.p. −10.2° C.), Refrigerant-133 (all isomers, b.p. 6.1° to 17° C.), Refrigerant-141b (b.p. 32° C.), Refrigerant-142 (all isomers b.p. −9.2° to 35.1° C.), Refrigerant-131 (b.p. 101° C.) and Refrigerant-151a (b.p.16.1° C.).

Exemplary of suitable hydrochlorocarbon compounds are 1,1,1-trichloroethane (b.p. 74.1° C.), 1,2-dichloroethane (b.p. 93.5° C.), 2-chloropentane (b.p. 96.9° C.) and 1,3-dichloropentane (b.p. 80.4° C.).

Exemplary of suitable hydrofluorocarbon compounds are Refrigerant-134 (b.p. −19.7° C.), Refrigerant-134a (b.p. −26.5° C.), and Refrigerant-143 (b.p. 5° C.).

Exemplary of non-halogen-containing organic compounds suitable as blowing agents halogen include cyclohexane (b.p. 80.7° C.), n-hexane (b.p. 69° C.), pentane (b.p. 35° C.) and the like. Mixtures of two or more such blowing agents are also suitable.

Preferred blowing agents for preparing the insulative polyurethane foam used in the present invention include Refrigerant-123, Refrigerant-141b, Refrigerant-142b, Refrigerant-134 and -134a and 1,1,1-trichloroethane due to availability, ease of handling and due to the desirable physical properties of polyurethane foams prepared therewith.

The blowing agent is employed in quantities sufficient to provide for a foam advantageously having an overall bulk density of from about 10 to about 200, preferably about 15 to about 100, and more preferably about 18 to about 60 kg/m$^3$.

Active hydrogen-containing compounds which are useful in the preparation of the polyurethane foam include those materials having two or more groups which contain an active hydrogen atoms which can react with an isocyanate, such as are described in U.S. Pat. No. 4,394,491, incorporated herein by reference. Collectively, such compounds are referred to as polyahls. Preferred among such polyahl compounds are those having at least two hydroxyl, primary or secondary amine, carboxylic acid, or thiol groups per molecule. Polyols, i.e., compounds having at least two hydroxyl groups per molecule, are especially preferred due to their desirable reactivity with polyisocyanates.

Suitable isocyanate reactive materials for preparing rigid polyurethanes include those having an equivalent weight of about 50 to about 700, preferably about 70 to about 300 and more preferably about 70 to about 150. Such isocyanate-reactive materials also advantageously have a functionality of at least 2, preferably about 3, up to about 16, preferably up to about 8, active hydrogen atoms per molecule.

Suitable additional isocyanate-reactive materials include polyether polyols, polyester polyols, polyhydroxyl-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof. Most preferred for preparing rigid foams, on the basis of performance, availability and cost, is a polyether polyol prepared by adding an alkylene oxide to an initiator having from about 2 to about 8, preferably about 3 to about 8 active hydrogen atoms. Exemplary of such polyether polyols include those commercially available under the trademark "VORANOL" such as VORANOL 202, VORANOL 360, VORANOL 370, VORANOL 446, VORANOL 490, VORANOL 575, VORANOL 800 all sold by The Dow Chemical Company, and PLURACOL TM 824, sold by BASF Wyandotte.

Other most preferred polyols include alkylene oxide derivatives of Mannich condensates, as taught, for example, in U.S. Pat. Nos. 3,297,597; 4,137,265 and 4,383,102, incorporated herein by reference, and aminoalkylpiperazine-initiated polyether polyols as described in U.S. Pat. Nos. 4,704,410 and 4,704,411, incorporated herein by reference.

Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5,5'-tetraisocyanate and the diverse polymethylenepolyphenylpolyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred are methylene-bridged polyphenylpolyisocyanates, due to their ability to crosslink the polyurethane. The isocyanate index (ratio of equivalents of isocyanate to equivalents of active hydrogen-containing groups) is advantageously from about 0.9 to about 5.0, preferably about 0.9 to about 3.0, more preferably about 1.0 to about 1.5.

In addition to the foregoing critical components, it is often desirable to employ certain other ingredients in preparing cellular polyurethane. Among these additional ingredients are water, catalyst, surfactant, flame retardant, preservative, colorant, antioxidants, reinforcing agent, filler, and the like.

Water is often employed in the role as a blowing agent precursor and processing aid. Water can react with isocyanate leading to the generation of carbon dioxide gas which then functions as a blowing agent in the foam-forming reaction. When present, the water is preferably used in amounts not exceeding about 7, preferably about 6, more preferably about 5 parts by weight per 100 parts by total weight active hydrogen-containing compound(s) present. Beneficial effects are seen when at least about 0.5 and preferably at least about 1 part of water per 100 parts total weight active hydrogen-containing compound(s), is present. Using amounts of water which exceeds these ranges is possible but the resulting foam may have undesirable physical properties such as poor dimensional stability and poor thermal insulation.

In making polyurethane foam, it is generally highly preferred to employ a minor amount of a surfactant to stabilize the foaming reaction mixture until it cures.

Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by total weight active hydrogen-containing compound(s) present are generally sufficient for this purpose.

One or more catalysts for the reaction of the active hydrogen-containing compound(s) with the polyisocyanate are advantageously used. Any suitable urethane catalyst may be used, including tertiary amine compounds and organometallic compounds. Exemplary tertiary amine compounds include triethylenediamine, N-methyl morpholine, pentamethyldiethylenetriamine, tetramethylethylenediamine, 1-methyl-4-dimethylaminoethylpiperazine, 3-methoxy-N-diethylpropylamine, N-ethyl morpholine, diethylethanolamine, N-coco morpholine, N,N-dimethyl-N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, may also optionally be employed herein. Such catalysts are used in an amount which measurably increases the rate of reaction of the polyisocyanate. Typical amounts are about 0.001 to about 1 parts of catalyst per 100 parts by total weight of active hydrogen-containing compound(s) present.

In making a polyurethane foam, the active hydrogen-containing compound(s), polyisocyanate and other components are contacted, thoroughly mixed and permitted to react and to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and active hydrogen-containing components. For example, it is often useful to blend the active hydrogen-containing compound(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the active hydrogen-containing compound(s) with the polyisocyanate to form a prepolymer, although such is not preferred.

ILLUSTRATIVE EMBODIMENTS

The following examples are given to illustrate the invention and should not be interpreted as limiting it in any way. Unless stated otherwise, all parts and percentages are given by weight.

EXAMPLE 1

A shaped inner liner suitable for preparing a refrigeration appliance unit is prepared by thermal molding of a composite material. The composite material is characterized in that a high impact polystyrene resin, STYRON TM 469, has applied to it a polyester film, KODAR TM -PETG-6373. The amount of polyester film present in the composite material prior to thermal molding is given in Table I expressed as a percent thickness based on the total thickness of the composite material. The thermal molding, or draw rates of the composite material to the shaped inner liner is 1:5.

The shaped inner liner is placed in a suitable mold and polyurethane foam poured-in-place against the polyester film of the shaped liner. On curing the complete unit comprising molded polyurethane foam having an average density of 30 Kg/m$^3$ and an inner liner with barrier film is subjected to thermocycling.

Thermocycling serves the purpose of accelerating the observation of solvent attack, if any on the inner line.

The thermocycle study comprises holding the foam and inner liner material at $-20°$ C. for 8 hours, proceeding by a period of 8 hours at $+20°$ C. and then a second period of 8 hours at $-20°$ C. and so forth for a given period of time. It is found that conducting thermocycle studies for periods up to about 10 weeks is sufficient to provide for a realistic estimation of performance of the unit.

When the thermocycling is complete, the degree of attack upon the styrenic resin by the blowing agent used in preparing the polyurethane foam can be assessed by counting the number of "surface" blisters observable on the opposite face of the inner liner to that in contact with the barrier film and polyurethane foam.

Table I indicates the results of the thermocycling study for a different thickness of PETG barrier film (indicated percent thickness is for composite material prior to drawing and shaping to give the inner liner) against different polyurethane foam.

Foam A is an appliance-designed rigid polyurethane foam prepared from the commercially available polyol formulation VORANOL TM RST 461 sold by The Dow Chemical Company reacted with a crude polymeric polyisocyanate average functionality 2.7. The physical blowing agent is dichlorotrifluoroethane (R-123) used in an amount to provide a foam having a free rise density of about 22 Kg/M$^3$.

Foam B is polyurethane foam prepared from similar components as Foam A only in this instance the polyol formulation VORANOL TM RST 461 has been modified by addition of water allowing for a 50 percent weight reduction in the amount of Refrigerant-123 required to provide foam of free-rise density about 22 Kg/M$^3$. An additional amount of isocyanate is used to compensate for the greater amount of water present.

The shape of the molded inner liner is such to provide points susceptible to attack. These points are identified as the edge or door frame; the lip or glider support/runner for a shelf; and the partition finger separating the colder freezer box of the refrigeration appliance unit from the slightly warmer main storage area.

TABLE I

| Sample No. | Foam type | PETG thickness % | Thermocycling (weeks) | Blister Count Edge | Blister Count Glider | Blister Count Partition |
|---|---|---|---|---|---|---|
| 1 | A | 5 | 0 | 1[1] | 0 | 0 |
| 2 | A | 5 | 4 | 3 | 0 | 0 |
| 3 | A | 5 | 10 | 2 | 10 | 10 |
| 4 | B | 5 | 4 | 2 | 2 | 1 |
| 5 | B | 10 | 4 | 0 | 0 | 0 |
| A* | A | 0 | 4 | >100 | 20 | >100 |
| B*[2] | A | 0 | 4 | >100 | 14 | >100 |

*not an example of this invention

Footnotes:
[1] Blister count after storage of freshly prepared foam 24 hours at room temperature.
[2] In comparative example B, the high impact polystyrene resin STYRON TM 469 is replaced by the ABS resin, MAGNUM TM 3403.

The data presented in Table I indicates the significant reduction in the number of blisters to be observed in the styrenic resin when protected by the polyester barrier film.

As an alternative to polyester film a coextruded film comprising polyethylene, ethylene vinyl alcohol, and polyvinylidene chloride polymers sold under the trademark SARANEX TM by The Dow Chemical Company is applied to the high impact polystyrene resin, STYRON TM 469 and contacted with Foam A. The thickness of the SARANEX TM film on the surface of the polystyrene resin is about 50 microns and the blister counts observed after 4 weeks thermocycling for the above-identified regions, respectively, are >100; 18; and >100.

What is claimed is:

1. An insulative cabinet wall structure for use in a thermally insulated apparatus which comprises:
   a. an outer wall element;
   b. an inner wall element comprising a synthetic resin;
   c. a foamed-in-situ polyurethane foam contiguous to said outer wall element and positioned between said outer wall element and said inner wall element; and
   d. a barrier film interposed between said foamed-in-situ polyurethane foam and said inner wall element,
characterized in that the synthetic resin comprises a thermoplastic styrenic polymer and in that the barrier film consists essentially of an amorphous thermoplastic polyester resin which is a co-polymer adduct of an aromatic dicarboxylic acid and an active hydrogen-containing material.

2. The insulative cabinet wall structure of claim 1 wherein the thermally insulated apparatus is a refrigeration appliance unit.

3. The insulative cabinet wall structure of claim 2 wherein the polyurethane foam is prepared in the presence of a physical blowing agent comprising a hydrohalocarbon compound.

4. The insulative cabinet wall structure of claim 3 wherein the hydrohalocarbon compound comprises a hydrochlorofluorocarbon, a hydrofluorocarbon, a hydrochlorocarbon or mixtures thereof.

5. The insulative cabinet wall structure of claim 4 wherein the hydrohalocarbon is a hydrochlorofluorocarbon comprising Refrigerant-123, Refrigerant-141b, Refrigerant-142b, or mixtures thereof.

6. The insulative cabinet wall structure of claim 4 wherein the hydrohalocarbon is the hydrofluorocarbon, Refrigerant-134a.

7. The insulative cabinet wall structure of claim 4 wherein the aromatic dicarboxylic acid comprises terephthalic acid, isophthalic acid or mixtures thereof.

8. The insulative cabinet wall structure of claim 7 wherein the thermoplastic polyester resin is a glycol-modified polyethyleneterephthalate resin.

9. The insulative cabinet wall structure of claim 8 wherein the barrier film has a thickness of at least 30 microns.

10. The insulative cabinet wall structure of claim 9 wherein the barrier film reduces the amount of blistering observed on the synthetic resin sheet.

11. The insulative cabinet wall of claim 1 wherein the thermoplastic styrenic resin is a high impact polystyrene resin or an acrylonitrile-butadiene-styrene copolymer resin.

12. The insulative cabinet wall of claim 11 wherein the thermoplastic styrenic resin is in contact with a barrier film consisting essentially of a thermoplastic copolyester resin, wherein the copolyester resin is present in a thickness of at least 30 microns and the foamed-in-situ polyurethane foam is prepared in the presence of a physical blowing agent comprising Refrigerant-123, refrigerant-141b, Refrigerant-134a, Refrigerant-142b, or mixtures thereof.

13. The insulative cabinet wall of claim 1 further comprising a tie layer between the synthetic resin sheet and the barrier film.

14. The insulative cabinet wall of claim 13 wherein the tie layer comprises an acrylonitrile-butadiene-styrene copolymer resin containing from about 5 to about 20 weight percent acrylonitrile.

15. The insulative cabinet wall of claim 13 wherein the tie layer comprises ethylene vinyl acetate.

16. A composite material suitable for thermolding which comprises:
   a thermoplastic synthetic resin sheet; and
   a barrier film in contact with said synthetic resin sheet,
characterized in that the synthetic resin comprises a thermoplastic styrenic polymer and in that the barrier film constitutes at least 4 percent of the total thickness of the synthetic resin sheet and barrier film, and said barrier film consists essentially of an amorphous thermoplastic polyester resin which is a co-polymer adduct of an aromatic dicarboxylic acid and an active hydrogen-containing material.

17. The composite sheet of claim 16 further comprising a tie layer between the synthetic resin sheet and the barrier film.

18. The composite sheet of claim 17 wherein the tie layer comprises an acrylonitrile-butadiene-styrene copolymer resin containing from about 5 to about 20 weight percent acrylonitrile.

19. The composite sheet of claim 17 wherein the tie layer comprises ethylene vinyl acetate.

* * * * *